(12) United States Patent
Stern et al.

(10) Patent No.: US 7,892,323 B2
(45) Date of Patent: Feb. 22, 2011

(54) HYDROGEN MANAGEMENT IN PETROCHEMICAL PROCESS UNITS

(75) Inventors: David L. Stern, Asbury, NJ (US); Bal K. Kaul, Faifax, VA (US); John Di-Yi Ou, Houston, TX (US); Dana L. Pilliod, League City, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 382 days.

(21) Appl. No.: 11/795,550

(22) PCT Filed: Jan. 23, 2006

(86) PCT No.: PCT/US2006/002295

§ 371 (c)(1),
(2), (4) Date: Mar. 5, 2008

(87) PCT Pub. No.: WO2006/079027

PCT Pub. Date: Jul. 27, 2006

(65) Prior Publication Data

US 2009/0007782 A1    Jan. 8, 2009

Related U.S. Application Data

(60) Provisional application No. 60/645,713, filed on Jan. 21, 2005.

(51) Int. Cl.
*B01D 53/047* (2006.01)
(52) U.S. Cl. .............................. 95/96; 96/125; 96/130; 96/144; 96/150
(58) Field of Classification Search .................... 95/96; 96/125, 130, 144, 150
See application file for complete search history.

(56) References Cited

U.S. PATENT DOCUMENTS

| 4,194,892 A | 3/1980 | Jones et al. |
| 5,540,758 A | 7/1996 | Agrawal et al. |
| 6,406,523 B1 | 6/2002 | Connor et al. |
| 6,451,095 B1 | 9/2002 | Keefer et al. |
| 6,488,747 B1 | 12/2002 | Keefer et al. |
| 6,533,846 B1 | 3/2003 | Keefer et al. |
| 6,565,635 B2 | 5/2003 | Keefer et al. |
| 6,607,584 B2 | 8/2003 | Moreau et al. |

OTHER PUBLICATIONS

R. Farrauto, S. Hwang, L. Shore, W. Ruettinger, J. Lampert, T. Giroux, Y. Liu and O. Llinich, "New Material Needs for Hydrocarbon Fuel Processing: Generating Hydrogen for the PEM Fuel Cell," Annual Review of Materials Research, vol. 33: 1-27 (Volume publication date Aug. 2003).

*Primary Examiner*—Robert J Hill, Jr.
*Assistant Examiner*—Christopher P Jones

(57) ABSTRACT

The management of hydrogen in hydrogen-containing streams associated with petrochemical process units wherein the hydrogen-containing stream is subjected rapid cycle pressure swing adsorption to increase the concentration of hydrogen therein.

6 Claims, No Drawings

HYDROGEN MANAGEMENT IN PETROCHEMICAL PROCESS UNITS

CROSS REFERENCE TO RELATED APPLICATIONS

This application is a 371 of PCT Application No. PCT/US06/02295 filed 23 Jan. 2006 which in turn claims priority to U.S. provisional Application No. 60/645,713, filed 21 Jan. 2005.

FIELD OF THE INVENTION

This invention relates to the management of hydrogen in hydrogen-containing streams associated with petrochemical process units wherein the hydrogen-containing stream is subjected rapid cycle pressure swing adsorption to increase the concentration of hydrogen therein.

BACKGROUND OF THE INVENTION

Hydrogen is vital for the operation of many of today's refinery and petrochemical process units, including hydroprocessing units in refineries and isomerization units for petrochemical plants. Since hydrogen is an important and valuable commodity in the various process units it would be beneficial if the concentration of hydrogen in hydrogen-containing streams associated with such process units can be increased by removing at least a portion of the other components of the hydrogen-containing stream.

SUMMARY OF THE INVENTION

In a preferred embodiment there is provided a process for increasing the hydrogen concentration in hydrogen-containing streams associated with petrochemical process units, which process comprises subjecting the hydrogen-containing steam to rapid cycle pressure swing adsorption unit containing a plurality of adsorbent beds and having a total cycle time of less than about 30 seconds and a pressure drop within each adsorbent bed of greater than about 5 inches of water per foot of bed length.

In another preferred embodiment, the total cycle time of rapid cycle pressure swing adsorption is less than about 15 seconds.

In yet another preferred embodiment the total cycle time is less than about 10 seconds and the pressure drop of each adsorbent bed is greater than about 10 inches of water per foot of bed length.

DETAILED DESCRIPTION OF THE INVENTION

Purified para and ortho xylene isomers are used on a large scale as intermediates for many derivatives, some of which include major petrochemicals. Demand for purified meta xylene is believed to be between 100 and 1000 kta, the volume level separating commodity and specialty chemical products. The 2005 industrial demand for para- and ortho-xylene is roughly 32,000 kta, split roughly 7:1. Para-xylene demand is so large that industry has developed processes to produce it from other aromatic molecules.

Routes for separating and converting the common feedstocks for the production of para-xylene include equilibrium processes and para-selective routes. The major routes enjoying current commercial use include: Xylene Isomerization, or the isomerization of xylenes from a mixture of C8 aromatics, Toluene disproportionation to make a mixture of equilibrium xylenes and benzene, Transalkylation of C9+ alkylaromatics with toluene and/or benzene, and Selective Toluene Disproportionation to para-xylene and benzene.

Three types of xylene isomerization processes, that differ in the way ethylbenzene is converted, have been commercialized, including the hydro-de-ethylation of ethylbenzene to benzene and ethane, the hydroisomerization of ethylbenzene to produce additional xylene, or the transallcylation of ethylbenzene, followed by distillative removal of the heavies formed.

In all of these chemistries, a xylene isomerization loop is employed. The C8 and C9+ feedstock is first fractionated to produce the C8 heart cut by removing C9+ aromatics in the C9 splitter; optionally an Ortho Tower is employed if ortho-xylene is desired. Para-xylene is recovered from the C8 heart cut in a sorption process; since the sorption process recovers >95% of the p-xylene in the feed, the raffinate has a low p-xylene content of ca. 1%. The p-xylene depleted raffinate from the sorption is then treated in the xylene isomerization reactor, in which ethylbenzene is hydrodealkylated, the xylenes are isomerized to equilibrium, and coboiling paraffins are hydrocracked to light gas. The isomerate is then distilled in successive towers: the stabilizer removes light gases, while benzene and toluene are removed as overhead in the splitter, and are subsequently distilled to produce benzene and toluene. The C8 isomerate is then combined with fresh feed, and recycled back to the C9+ splitter for further processing. Since the equilibrium concentration of para-xylene is ca. 24%, the C8 stream undergoes approximately three recycles if only para-xylene is recovered.

Because of the high recycle, avoiding undesirable reactions in the xylene isomerization reactor is critical. Undesirable reactions include methyl and ethyl aromatic transalkylation of xylenes to yield C9+ aromatics, saturation of aromatics including both benzene and xylenes to yield cyclohexane and dimethylcyclohexane, and hydrocracking of aromatics to produce light gas. All four reactions reduce the ultimate yield of para-xylene, and are referred to as xylene loss, but reactions and reduce useful product yield, since they result in net aromatic yield loss. Aromatic saturation is deleterious, since it also reduces the purity of the benzene product, which must be avoided if the distilled benzene is to be sold as chemical grade. Typical process conditions are 400-470° C., 14-21 bar, 1-5 molar hydrogen:hydrocarbon, and 1-20 WHSV C8 aromatic feedstock. (see for example, U.S. Pat. No. 5,977,420).

Toluene disproportionation, or selective toluene disproportionation, is also used industrially for the production of para xylene. Process conditions are: 400-470° C., 200-500 psig, 0.5-5 molar hydrogen to hydrocarbon, and 2-5 WHSV C8 aromatic feedstock. Feedstock toluene is extinction recycled and the products are benzene, C8 aromatics enriched in p-xylene and ethylbenzene, light paraffins, and C9+ aromatics. Per-pass toluene conversion is limited to about 32% if high yields of para-xylene are desired, or 45% for an equilibrium xylene distribution as product.

Commercial processes for methylaromatics transalkylation processing can be roughly divided into two types, depending on feedstock employed: transalkylation of toluene with C9/C10 aromatics, and conversion of heavier feedstocks, such as C9/C10 aromatics, without added toluene or benzene. Both process types employ the methylaromatic and aromatic de-ethylation/de-propylation chemistry described above. These processes operate at 400-470° C., 200-400 psig, 1-5 molar hydrogen:hydrocarbon, and 0.5-5 WHSV based on aromatic feedstock.

Toluene can be hydrocracked to benzene and methane in hydrodealkylation (HDA) processing. HDA, which currently accounts for approximately 15% of petrochemical grade benzene production, can be carried out either catalytically or thermally. The catalytic process utilizes acidic, supported Group VIII metal or metal oxide supported on alumina, and operates at temperatures below 500° C. in order to minimize metal sintering. Thermal processing employs high temperatures (typically >650° C.), and high concentrations of hydrogen (H2:Toluene is typically 2-6). Thermal HDA is currently the dominant route for new process units using HDA, since they produce high yields of benzene and avoid the use of a catalyst which needs to be replaced periodically. A nearly quantitative molar yield of benzene can be recovered (99%), but the formation of methane is a net aromatic weight yield loss, and hence the ultimate net weight yield is limited to ca. 84%. The relative pricing of benzene and toluene vary over the course of petrochemical cycles and thus dictate economics, but as a rule of thumb, HDA is favorable when the spot pricing of benzene is greater than 1.25 times that of toluene.

As can be seen from the information above, hydrogen is critical in the petrochemical field. Hydrogen is used in several processes, including xylene isomerization processing, toluene disproportionation to mixed xylenes and benzene, selective toluene disproportionation to primarily para-xylene, and benzene, and toluene, benzene, and heavies transalkylation to produce additional mixed xylenes, as well as hydrodealkylation of toluene to produce benzene. Hydrogen is critical in all of these processes, to saturate the olefins formed, to participate in the chemistry in the catalytic processes, and to reduce catalyst aging.

Clearly, ways to increase the purity of hydrogen by the removal of contaminants, such as light hydrocarbons, or impurities in the hydrogen feed such as hydrogen sulfide, ammonia, carbon monoxide, and carbon dioxide, can have a beneficially effect on petrochemical operations In Conventional Pressure Swing Adsorption ("conventional PSA") a gaseous mixture is conducted under pressure for a period of time over a first bed of a solid sorbent that is selective or relatively selective for one or more components, usually regarded as a contaminant that is to be removed from the gas stream. It is possible to remove two or more contaminants simultaneously but for convenience, the component or components that are to be removed will be referred to in the singular and referred to as a contaminant. The gaseous mixture is passed over a first adsorption bed in a first vessel and emerges from the bed depleted in the contaminant that remains sorbed in the bed. After a predetermined time or, alternatively when a break-through of the contaminant is observed, the flow of the gaseous mixture is switched to a second adsorption bed in a second vessel for the purification to continue. While the second bed is in adsorption service, the sorbed contaminant is removed from the first adsorption bed by a reduction in pressure, usually accompanied by a reverse flow of gas to desorb the contaminant. As the pressure in the vessels is reduced, the contaminant previously adsorbed on the bed is progressively desorbed into the tail gas system that typically comprises a large tail gas drum, together with a control system designed to minimize pressure fluctuations to downstream systems. The contaminant can be collected from the tail gas system in any suitable manner and processed further or disposed of as appropriate. When desorption is complete, the sorbent bed may be purged with an inert gas stream, e.g., nitrogen or a purified stream of the process gas. Purging may be facilitated by the use of a higher temperature purge gas stream.

After, e.g., breakthrough in the second bed, and after the first bed has been regenerated so that it is again prepared for adsorption service, the flow of the gaseous mixture is switched from the second bed to the first bed, and the second bed is regenerated. The total cycle time is the length of time from when the gaseous mixture is first conducted to the first bed in a first cycle to the time when the gaseous mixture is first conducted to the first bed in the immediately succeeding cycle, i.e., after a single regeneration of the first bed. The use of third, fourth, fifth, etc. vessels in addition to the second vessel, as might be needed when adsorption time is short but desorption time is long, will serve to increase cycle time.

Thus, in one configuration, a pressure swing cycle will include a feed step, at least one depressurization step, a purge step, and finally a repressurization step to prepare the adsorbent material for reintroduction of the feed step. The sorption of the contaminants usually takes place by physical sorption onto the sorbent that is normally a porous solid such as activated carbon, alumina, silica or silica-alumina that has an affinity for the contaminant. Zeolites are often used in many applications since they may exhibit a significant degree of selectivity for certain contaminants by reason of their controlled and predictable pore sizes. Normally, chemical reaction with the sorbent is not favored in view of the increased difficulty of achieving desorption of species which have become chemically bound to the sorbent, but chemisorption is my no means to be excluded if the sorbed materials may be effectively desorbed during the desorption portion of the cycle, e.g., by the use of higher temperatures coupled with the reduction in pressure. Pressure swing adsorption processing is described more fully in the book entitled *Pressure Swing Adsorption*, by D. M. Ruthven, S. Farouq & K. S. Knaebel (VCH Publishers, 1994).

Conventional PSA possesses significant inherent disadvantages for a variety of reasons. For example, conventional PSA units are costly to build and operate and are significantly larger in size for the same amount of hydrogen that needs to be recovered from hydrogen-containing gas streams as compared to RCPSA. Also, a conventional pressure swing adsorption unit will generally have cycle times in excess of one minute, typically in excess of 2 to 4 minutes due to time limitations required to allow diffusion of the components through the larger beds utilized in conventional PSA and the equipment configuration and valving involved. In contrast, rapid cycle pressure swing adsorption is utilized which has total cycle times of less than one minute. The total cycle times of RCPSA may be less than 30 seconds, preferably less than 15 seconds, more preferably less than 10 seconds, even more preferably less than 5 seconds, and even more preferably less 2 seconds. Further, the rapid cycle pressure swing adsorption units used can make use of substantially different sorbents, such as, but not limited to, structured materials such as monoliths.

The overall adsorption rate of the adsorption processes, whether conventional PSA or RCPSA, is characterized by the mass transfer rate constant in the gas phase ($\tau_g$) and the mass transfer rate constant in the solid phase ($\tau_s$). A material's mass transfer rates of a material are dependent upon the adsorbent, the adsorbed compound, the pressure and the temperature. The mass transfer rate constant in the gas phase is defined as:

$$a.\ \tau_g = D_g/R_g^2 \text{ (in cm}^2\text{/sec)} \tag{1}$$

where $D_g$ is the diffusion coefficient in the gas phase and $R_g$ is the characteristic dimension of the gas medium. Here the gas diffusion in the gas phase, $D_g$, is well known in the art (i.e., the conventional value can be used) and the characteristic dimension of the gas medium, $R_g$ is defined as the channel width between two layers of the structured adsorbent material.

The mass transfer rate constant in the solid phase of a material is defined as:

a. $\tau_s = D_s/R_s^2$ (in cm$^2$/sec)  (2)

where $D_s$ is the diffusion coefficient in the solid phase and $R_s$ is the characteristic dimension of the solid medium. Here the gas diffusion coefficient in the solid phase, $D_s$, is well known in the art (i.e., the conventional value can be used) and the characteristic dimension of the solid medium, $R_s$ is defined as the width of the adsorbent layer.

D. M. Ruthven & C. Thaeron, *Performance of a Parallel Passage Absorbent Contactor*, Separation and Purification Technology 12 (1997) 43-60, which is incorporated by reference, clarifies that for flow through a monolith or a structured adsorbent that channel width is a good characteristic dimension for the gas medium, $R_g$. U.S. Pat. No. 6,607,584 to Moreau et al., which is incorporated by reference, also describes the details for calculating these transfer rates and associated coefficients for a given adsorbent and the test standard compositions used for conventional PSA. Calculation of these mass transfer rate constants is well known to one of ordinary skill in the art and may also be derived by one of ordinary skill in the art from standard testing data.

Conventional PSA relies on the use of adsorbent beds of particulate adsorbents. Additionally, due to construction constraints, conventional PSA is usually comprised of 2 or more separate beds that cycle so that at least one or more beds is fully or at least partially in the feed portion of the cycle at any one time in order to limit disruptions or surges in the treated process flow. However, due to the relatively large size of conventional PSA equipment, the particle size of the adsorbent material is general limited particle sizes of about 1 mm and above. Otherwise, excessive pressure drop, increased cycle times, limited desorption, and channeling of feed materials will result.

In an embodiment, RCPSA utilizes a rotary valving system to conduct the gas flow through a rotary sorber module that contains a number of separate adsorbent bed compartments or "tubes", each of which is successively cycled through the sorption and desorption steps as the rotary module completes the cycle of operations. The rotary sorber module is normally comprised of multiple tubes held between two seal plates on either end of the rotary sorber module wherein the seal plates are in contact with a stator comprised of separate manifolds wherein the inlet gas is conducted to the RCPSA tubes and processed purified product gas and the tail gas exiting the RCPSA tubes is conducted away from rotary sorber module. By suitable arrangement of the seal plates and manifolds, a number of individual compartments or tubes may pass through the characteristic steps of the complete cycle at any one time. In contrast with conventional PSA, the flow and pressure variations required for the RCPSA sorption/desorption cycle changes in a number of separate increments on the order of seconds per cycle, which smoothes out the pressure and flow rate pulsations encountered by the compression and valving machinery. In this form, the RCPSA module includes valving elements angularly spaced around the circular path taken by the rotating sorption module so that each compartment is successively passed to a gas flow path in the appropriate direction and pressure to achieve one of the incremental pressure/flow direction steps in the complete RCPSA cycle. One key advantage of the RCPSA technology is a significantly more efficient use of the adsorbent material. The quantity of adsorbent required with RCPSA technology can be only a fraction of that required for conventional PSA technology to achieve the same separation quantities and qualities. As a result, the footprint, investment, and the amount of active adsorbent required for RCPSA is significantly lower than that for a conventional PSA unit processing an equivalent amount of gas.

In an embodiment, RCPSA bed length unit pressure drops, required adsorption activities, and mechanical constraints (due to centrifugal acceleration of the rotating beds in RCPSA), prevent the use of many conventional PSA adsorbent bed materials, in particular adsorbents that are in a loose pelletized, particulate, beaded, or extrudate form. In a preferred embodiment, adsorbent materials are secured to a supporting understructure material for use in an RCPSA rotating apparatus. For example, one embodiment of the rotary RCPSA apparatus can be in the form of adsorbent sheets comprising adsorbent material coupled to a structured reinforcement material. A suitable binder may be used to attach the adsorbent material to the reinforcement material. Non-limiting examples of reinforcement material include monoliths, a mineral fiber matrix, (such as a glass fiber matrix), a metal wire matrix (such as a wire mesh screen), or a metal foil (such as aluminum foil), which can be anodized. Examples of glass fiber matrices include woven and non-woven glass fiber scrims. The adsorbent sheets can be made by coating a slurry of suitable adsorbent component, such as zeolite crystals with binder constituents onto the reinforcement material, non-woven fiber glass scrims, woven metal fabrics, and expanded aluminum foils. In a particular embodiment, adsorbent sheets or material are coated onto ceramic supports.

An absorber in a RCPSA unit typically comprises an adsorbent solid phase formed from one or more adsorbent materials and a permeable gas phase through which the gases to be separated flow from the inlet to the outlet of the adsorber, with a substantial portion of the components desired to be removed from the stream adsorbing onto the solid phase of the adsorbent. This gas phase may be called "circulating gas phase", but more simply "gas phase". The solid phase includes a network of pores, the mean size of which is usually between approximately 0.02 μm and 20 μm. There may be a network of even smaller pores, called "micropores", this being encountered, for example, in microporous carbon adsorbents or zeolites. The solid phase may be deposited on a non-adsorbent support, the primary function of which is to provide mechanical strength for the active adsorbent materials and/or provide a thermal conduction function or to store heat. The phenomenon of adsorption comprises two main steps, namely passage of the adsorbate from the circulating gas phase onto the surface of the solid phase, followed by passage of the adsorbate from the surface to the volume of the solid phase into the adsorption sites.

In an embodiment, RCPSA utilizes a structured adsorbent which is incorporated into the tubes utilized in the RSPCA apparatus. These structured adsorbents have an unexpectedly high mass transfer rate since the gas flows through the channels formed by the structured sheets of the adsorbent which offers a significant improvement in mass transfer as compared to a traditional packed fixed bed arrangement as utilized in conventional PSA. The ratio of the transfer rate of the gas phase ($\tau_g$) and the mass transfer rate of the solid phase ($\tau_s$) in the current invention is greater than 10, preferably greater than 25, more preferably greater than 50. These extraordinarily high mass transfer rate ratios allow RCPSA to produce high purity hydrogen streams at high recovery rates with only a fraction of the equipment size, adsorbent volume, and cost of conventional PSA.

The structured adsorbent embodiments also results in significantly greater pressure drops to be achieved through the adsorbent than conventional PSA without the detrimental effects associated with particulate bed technology. The adsorbent beds can be designed with adsorbent bed unit length pressure drops of greater than 5 inches of water per foot of bed length, more preferably greater than 10 in. $H_2O$/ft, and even more preferably greater than 20 in. $H_2O$/ft. This is in contrast with conventional PSA units where the adsorbent bed unit length pressure drops are generally limited to below about 5 in. $H_2O$/ft depending upon the adsorbent used, with most conventional PSA units being designed with a pressure drop of about 1 in. $H_2O$/ft or less to minimize the problems discussed that are associated with the larger beds, long cycle time, and particulate absorbents of conventional PSA units. The adsorbent beds of conventional PSA cannot accommodate higher pressure drops because of the risk of fluidizing the beds which results in excessive attrition and premature unit shutdowns due to accompanying equipment problems and/or a need to add or replace lost adsorbent materials. These markedly higher adsorbent bed unit length pressure drops allow RCPSA adsorbent beds to be significantly more compact, shorter, and efficient than those utilized in conventional PSA.

In an embodiment, high unit length pressure drops allow high vapor velocities to be achieved across the structured adsorbent beds. This results in a greater mass contact rate between the process fluids and the adsorbent materials in a unit of time than can be achieved by conventional PSA. This results in shorter bed lengths, higher gas phase transfer rates ($\tau_g$) and improved hydrogen recovery. With these significantly shorter bed lengths, total pressure drops of the RSCPA application of the present invention can be maintained at total bed pressure differentials during the feed cycle of about 0.5 to 50 psig, preferably less than 30 psig, while minimizing the length of the active beds to normally less than 5 feet in length, preferably less than 2 feet in length and, as short as less than 1 foot in length.

The absolute pressure levels employed during the RCPSA process are not critical. In practice, provided that the pressure differential between the adsorption and desorption steps is sufficient to cause a change in the adsorbate fraction loading on the adsorbent thereby providing a delta loading effective for separating the stream components processed by the RCPSA unit. Typical absolute operating pressure levels range from about 50 to 2500 psia. However, it should be noted that the actual pressures utilized during the feed, depressurization, purge and repressurization stages are highly dependent upon many factors including, but not limited to, the actual operating pressure and temperature of the overall stream to be separated, stream composition, and desired recovery percentage and purity of the RCPSA product stream. The RCPSA process is not specifically limited to any absolute pressure and due to its compact size becomes incrementally more economical than conventional PSA processes at the higher operating pressures. U.S. Pat. Nos. 6,406,523; 6,451,095; 6,488,747; 6,533,846 and 6,565,635, all of which are incorporated herein by reference, disclose various aspects of RCPSA technology.

In an embodiment and an example, the rapid cycle pressure swing adsorption system has a total cycle time, $t_{TOT}$, to separate a feed gas into product gas (in this case, a hydrogen-enriched stream) and a tail (exhaust) gas. The method generally includes the steps of conducting the feed gas having a hydrogen purity F %, where F is the percentage of the feed gas which is the weakly-adsorbable (hydrogen) component, into an adsorbent bed that selectively adsorbs the tail gas and passes the hydrogen product gas out of the bed, for time, $t_F$, wherein the hydrogen product gas has a purity of P % and a rate of recovery of R %. Recovery R % is the ratio of amount of hydrogen retained in the product to the amount of hydrogen available in the feed. Then the bed is co-currently depressurized for a time, $t_{CO}$, followed by counter-currently depressurizing the bed for a time, $t_{CN}$, wherein desorbate (tail gas or exhaust gas) is released from the bed at a pressure greater than or equal to 1 psig. The bed is purged for a time, $t_P$, typically with a portion of the hydrogen product gas. Subsequently the bed is repressurized for a time, $t_{RP}$, typically with a portion of hydrogen product gas or feed gas, wherein the cycle time, $t_{TOT}$, is equal to the sum of the individual cycle times comprising the total cycle time, i.e.:

a. $t_{TOT}=t_F+t_{CO}+t_{CN}+t_P+t_{RP}$ (3)

This embodiment encompasses, but is not limited to, RCPSA processes such that either the rate of recovery, R %>80% for a product purity to feed purity ratio, P %/F %>1.1, and/or the rate of recovery, R %>90% for a product purity to feed purity ratio, 0<P %/F %<1.1. Results supporting these high recovery & purity ranges can be found in Examples 4 through 10 herein. Other embodiments will include applications of RCPSA in processes where hydrogen recovery rates are significantly lower than 80%. Embodiments of RCPSA are not limited to exceeding any specific recovery rate or purity thresholds and can be as applied at recovery rates and/or purities as low as desired or economically justifiable for a particular application.

It should also be noted that it is within the scope of this invention that steps $t_{CO}$, $t_{CN}$, or $t_P$ of equation (3) above can be omitted together or in any individual combination. However it is preferred that all steps in the above equation (3) be performed or that only one of steps $t_{CO}$ or $t_{CN}$ be omitted from the total cycle. However, additional steps can also be added within a RCPSA cycle to aid in enhancing purity and recovery of hydrogen. Thus enhancement could be practically achieved in RCPSA because of the small portion of absorbent needed and due to the elimination of a large number of stationary valves utilized in conventional PSA applications.

In an embodiment, the tail gas is also preferably released at a pressure high enough so that the tail gas may be fed to another device absent tail gas compression. More preferably the tail gas pressure is greater than or equal to 60 psig. In a most preferred embodiment, the tail gas pressure is greater than or equal to 80 psig. At higher pressures, the tail gas can be conducted to a fuel header.

Practice of the present invention can have the following benefits:

(a) Increasing the purity of hydrogen-containing stream(s) available as makeup gas, or of streams which must be upgraded to higher purity before they are suitable as make-up gas.

(b) Increasing the purity of hydrogen-containing recycle gas streams resulting in an increase in overall hydrogen treat gas purity in the reactor to allow for higher hydrotreating severity or additional product treating.

(c) Use for $H_2$ recovery from hydroprocessing purge gases, either where significant concentrations of $H_2S$ are present (before gas scrubbing) or after gas scrubbing (typically <100 vppm $H_2S$).

In hydroprocessing, increased $H_2$ purity translates to higher $H_2$ partial pressures in the hydroprocessing reactor(s). This both increases the reaction kinetics and decreases the rate of catalyst deactivation. The benefits of higher $H_2$ partial pressures can be exploited in a variety of ways, such as:

operating at lower reactor temperature, which reduces energy costs, decreases catalyst deactivation, and extends catalyst life; increasing unit feed rate; processing more sour (higher sulfur) feedstocks; processing higher concentrations of cracked feedstocks; improved product color, particularly near end of run; debottlenecking existing compressors and/or treat gas circuits (increased scf $H_2$ at constant total flow, or same scf $H_2$ at lower total flow); and other means that would be apparent to one skilled in the art.

Increased $H_2$ recovery also offers significant potential benefits, some of which are described as follows:

(i) reducing the demand for purchased, manufactured, or other sources of $H_2$ within the refinery;

(ii) increasing hydroprocessing feed rates at constant (existing) makeup gas demands as a result of the increased hydrogen recovery;

(iii) improving the hydrogen purity in hydroprocessing for increased heteroatom removal efficiencies;

(iv) removing a portion of the $H_2$ from refinery fuel gas which is detrimental to the fuel gas due to hydrogen's low BTU value which can present combustion capacity limitations and difficulties for some furnace burners;

(v) Other benefits that would be apparent to one knowledgeable in the art.

The following examples are presented for illustrative purposes only and should not be cited as being limiting in any way.

EXAMPLES

Example 1

This example describes the conventional operation of refinery process units without the benefits of the invention. A first process distillate treater operating at 35 barg, is fed with a mixture of distillate fuel from different upstream processing units such as vacuum pipestills or selective catalytic treatments units, at a typical rate of 160 m³/h.

A second process distillate (e.g., gas oil) treater operating at 20 barg, is fed with a mixture of oil from different upstream processing units such as atmospheric pipestills or fluid catalytic crackers, at a typical rate of 200 m³/h. The second unit can be operated in conjunction with the first in different conventional modes, each mode designed to make distillate products that meet sulfur specifications. For example the first treater produces a product with 50 ppm sulfur, whereas the second treater can make either product with 2000 ppm sulfur. When the conventional unit operation is practiced by the former mode, hydrogen consumption in the second unit is 2400 Nm³/h with a treat gas rate of 14 Nm³/h and product sulfur is 1250 ppm. Corresponding values for the first unit are hydrogen consumption of 3500 Nm³/h, treat gas rate of 27 Nm³/h and product sulfur of 44 ppm. These values represent an example without the benefits of using RCPSA in the process configurations.

Example 2

This example illustrates a first embodiment of the invention, where the RCPSA unit is placed on an outlet of a second acid scrubber. In this mode of operation of the invention, hydrogen consumption in the second refinery unit is 3500 Nm³/h with a treat gas rate of 14 Nm³/h and product sulfur of 1100 ppm. Corresponding values for the first unit under this mode of operation are hydrogen consumption of 3900 Nm³/h, treat gas rate of 27 Nm³/h and product sulfur of 27 ppm (vs. 44 ppm in Example 1). It is seen from this example that this mode of operation permits significant increases in hydrogen consumption in both first and second treaters and further reduced sulfur levels in both product from treaters, when compared to conventional operation described in Example 1, allowing to process more feed and have more low sulfur distillate product.

Example 3

This example illustrates second embodiment of the invention, where a rapid cycle PSA unit is placed within the configuration of the units of Example 1. In doing so, treat gas purity increases in the second treater, and consequently hydrogen consumption in the second treater increases by 1500 Nm³/h to 3900 Nm³/h. Additionally in the second unit in this mode of the invention, the treat gas rate is 9 Nm³/h and product sulfur of 1250 ppm. Corresponding values for the first unit under this embodiment of the invention are hydrogen consumption of 3500 Nm³/h, treat gas rate of 27 Nm³/h and product sulfur of 35 ppm. It will be seen from Example 2 that this mode of operation permits an increase of hydrogen consumption by almost 50% and a reduced sulfur content (35 ppm vs. 44 ppm for Example 1). Unexpectedly this example illustrates not as much sulfur reduction as in Example 2, because some of the aromatics are saturated, which does not leave additional hydrogen for deep desulfurization.

Example 4

In this example, the refinery stream is at 480 psig with tail gas at 65 psig whereby the pressure swing is 6.18. The feed composition and pressures are typical of refinery processing units such as those found in hydroprocessing or hydrotreating applications. In this example typical hydrocarbons are described by their carbon number i.e. $C_1$=methane, $C_2$=ethane etc. The RCPSA is capable of producing hydrogen at >99% purity and >81% recovery over a range of flow rates. Tables 1a and 1b show the results of computer simulation of the RCPSA and the input and output percentages of the different components for this example. Tables 1a and 1b also show how the hydrogen purity decreases as recovery is increased from 89.7% to 91.7% for a 6 MMSCFD stream at 480 psig and tail gas at 65 psig.

Tables 1a & 1b

Composition (mol %) of input and output from RCPSA (67 ft³) in H2 purification.

Feed is at 480 psig, 122 deg F. and Tail gas at 65 psig.

Feed rate is about 6 MMSCFD.

TABLE 1a

Higher purity
Step Times in seconds are $t_F$ = 1, $t_{CO}$ = 0.167, $t_{CN}$ = 0, $t_P$ = 0.333, $t_{RP}$ = 0.5

|  | feed | product | Tail-Gas |
|---|---|---|---|
| H2 | 88.0 | 98.69 | 45.8. |
| C1 | 6.3 | 1.28 | 25.1 |
| C2 | 0.2 | 0.01 | 1.0 |
| C3 | 2.6 | 0.01 | 12.3 |
| C4+ | 2.9 | 0.00 | 14.8 |
| H2O | 2000 vppm | 65 vppm | 9965 vppm |
| total (MMSCFD) | 6.162 | 4.934 | 1.228 |
|  | 480 psig | 470 psig | 65 psig |

H2 at 98.6% purity, 89.7% recovery

TABLE 1b

Higher purity
Step Times in seconds are $t_F = 1$, $t_{CO} = 0.333$,
$t_{CN} = 0$, $t_P = 0.167$, $t_{RP} = 0.5$

|  | feed | product | Tail-Gas |
| --- | --- | --- | --- |
| H2 | 88.0 | 97.80 | 45.9 |
| C1 | 6.3 | 2.14 | 25.0 |
| C2 | 0.2 | 0.02 | 1.0 |
| C3 | 2.6 | 0.02 | 12.3 |
| C4+ | 2.9 | 0.00 | 14.9 |
| H2O | 2000 vppm | 131 vppm | 10016 vpm |
| total (MMSCFD) | 6.160 | 5.085 | 1.074 |
|  | 480 psig | 470 psig | 65 psig |

H2 at 97.8% purity, 91.7% recovery

The RCPSA's described in the present invention operate a cycle consisting of different steps. Step 1 is feed during which product is produced, step 2 is co-current depressurization, step 3 is counter-current depressurization, step 4 is purge, usually counter-current) and step 5 is repressurization with product. In the RCPSA's described here at any instant half the total number of beds are on the feed step. In this example, $t_{TOT} = 2$ sec in which the feed time, $t_F$, is one-half of the total cycle.

Example 5

In this example, the conditions are the same as in Example 4. Table 2a shows conditions utilizing both a co-current and counter-current steps to achieve hydrogen purity >99%. Table 2b shows that the counter-current depressurization step may be eliminated, and a hydrogen purity of 99% can still be maintained. In fact, this shows that by increasing the time of the purge cycle, $t_P$, by the duration removed from the counter-current depressurization step, $t_{CN}$, that hydrogen recovery can be increased to a level of 88%.

Tables 2a & 2b

Effect of step durations on H2 purity and recovery from an RCPSA (67 ft³). Same conditions as Table 1. Feed is at 480 psig, 122 deg F. and Tail gas at 65 psig. Feed rate is about 6 MMSCFD.

TABLE 2a

With counter-current depress, Intermediate pressure = 105 psig

| purity % | recovery % | $t_F$ s | $t_{CO}$ s | $t_{CN}$ s | $t_P$ s | $t_{RP}$ s |
| --- | --- | --- | --- | --- | --- | --- |
| 98.2 | 84.3 | 1 | 0.283 | 0.05 | 0.167 | 0.5 |
| 98.3 | 85 | 1 | 0.166 | 0.167 | 0.167 | 0.5 |
| 99.9 | 80 | 1 | 0.083 | 0.25 | 0.167 | 0.5 |

TABLE 2b

Without counter-current depress

| purity % | recovery % | $t_F$ s | $t_{CO}$ s | $t_{CN}$ s | $t_P$ s | $t_{RP}$ s |
| --- | --- | --- | --- | --- | --- | --- |
| 97.8 | 91.7 | 1 | 0.333 | 0 | 0.167 | 0.5 |
| 98.7 | 90 | 1 | 0.166 | 0 | 0.334 | 0.5 |
| 99 | 88 | 1 | 0.083 | 0 | 0.417 | 0.5 |

Example 6

This example shows a 10 MMSCFD refinery stream, once again containing typical components, as shown in feed column of Table 3 (e.g. the feed composition contains 74% H₂). The stream is at 480 psig with RCPSA tail gas at 65 psig whereby the absolute pressure swing is 6.18. Once again the RCPSA of the present invention is capable of producing hydrogen at >99% purity and >85% recovery from these feed compositions. Tables 3a and 3b show the results of this example.

Tables 3a & 3b

Composition (mol %) of input and output from RCPSA (53 ft³) in H2 purification. Feed is at 480 psig, 101 deg F. and Tail gas at 65 psig.

Feed rate is about 10 MMSCFD.

TABLE 3a

Higher purity
Step Times in seconds are $t_F = 0.583$, $t_{CO} = 0.083$,
$t_{CN} = 0$, $t_P = 0.25$, $t_{RP} = 0.25$

|  | feed | product | Tail-Gas |
| --- | --- | --- | --- |
| H2 | 74.0 | 99.98 | 29.8 |
| C1 | 14.3 | 0.02 | 37.6 |
| C2 | 5.2 | 0.00 | 13.8 |
| C3 | 2.6 | 0.00 | 7.4 |
| C4+ | 3.9 | 0.00 | 11.0 |
| H2O | 2000 vppm | 0.3 vppm | 5387 vppm |
| total (MMSCFD) | 10.220 | 6.514 | 3.705 |
|  | 480 psig | 470 psig | 65 psig |

H2 at 99.98% purity and 86% recovery

TABLE 3b

Lower purity
Step Times in seconds are $t_F = 0.5$, $t_{CO} = 0.167$,
$t_{CN} = 0$, $t_P = 0.083$, $t_{RP} = 0.25$

|  | feed | product | Tail-Gas |
| --- | --- | --- | --- |
| H2 | 74.0 | 93.12 | 29.3 |
| C1 | 14.3 | 6.34 | 31.0 |
| C2 | 5.2 | 0.50 | 16.6 |
| C3 | 2.6 | 0.02 | 8.9 |
| C4+ | 3.9 | 0.00 | 13.4 |
| H2O | 2000 vppm | 142 vppm | 6501 vpm |
| total (MMSCFD) | 10.220 | 7.240 | 2.977 |
|  | 480 psig | 470 psig | 65 psig |

H2 at 93% purity and 89% recovery

In both cases shown in Tables 3a and 3b above, although tail gas pressure is high at 65 psig, the present invention shows that high purity (99%) may be obtained if the purge step, $t_P$, is sufficiently increased.

Tables 2a, 2b and 3a show that for both 6 MMSCFD and 10 MMSCFD flow rate conditions, very high purity hydrogen at ~99% and >85% recovery is achievable with the RCPSA. In both cases the tail gas is at 65 psig. Such high purities and recoveries of product gas achieved using the RCPSA with all the exhaust produced at high pressure have not been discovered before and are a key feature of the present invention.

Table 3c shows the results for an RCPSA (volume=49 cubic ft) that delivers high purity (>99%) H₂ at high recovery for the same refinery stream discussed in Tables 3a and 3b. As compared to Table 3a, Table 3c shows that similar purity and recovery rates can be achieved by simultaneously decreasing the duration of the feed cycle, $t_F$, and the purge cycle, $t_P$.

TABLE 3c

Effect of step durations on H2 purity and recovery from an RCPSA (49 ft³). Feed is at 480 psig, 101 deg F. and Tail gas at 65 psig. Feed rate is about 10 MMSCFD. Without counter-current depress

| purity % | recovery % | $t_F$ s | $t_{CO}$ s | $t_{CN}$ s | $t_P$ s | $t_{RP}$ s |
|---|---|---|---|---|---|---|
| 95.6 | 87.1 | 0.5 | 0.167 | 0 | 0.083 | 0.25 |
| 97.6 | 86 | 0.5 | 0.117 | 0 | 0.133 | 0.25 |
| 99.7 | 85.9 | 0.5 | 0.083 | 0 | 0.167 | 0.25 |

Example 7

In this example, Table 4 further illustrates the performance of RCPSA's operated in accordance with the invention being described here. In this example, the feed is a typical refinery stream and is at a pressure of 300 psig. The RCPSA of the present invention is able to produce 99% pure hydrogen product at 83.6% recovery when all the tail gas is exhausted at 40 psig. In this case the tail gas can be sent to a flash drum or other separator or other downstream refinery equipment without further compression requirement. Another important aspect of this invention is that the RCPSA also removes CO to <2 vppm, which is extremely desirable for refinery units that use the product hydrogen enriched stream. Lower levels of CO ensure that the catalysts in the downstream units operate without deterioration in activity over extended lengths. Conventional PSA cannot meet this CO specification and simultaneously also meet the condition of exhausting all the tail gas at the higher pressure, such as at typical fuel header pressure or the high pressure of other equipment that processes such RCPSA exhaust. Since all the tail gas is available at 40 psig or greater, no additional compression is required for integrating the RCPSA with refinery equipment.

TABLE 4

Composition (mol %) of input and output from RCPSA (4 ft³) in carbon monoxide and hydrocarbon removal from hydrogen. Feed is at 300 psig, 101 deg F., and Feed rate is about 0.97 MMSCFD. Step Times in seconds are $t_F = 0.5$, $t_{CO} = 0.1$, $t_{CN} = 0$, $t_P = 0.033$, $t_{RP} = 0.066$

| | feed | product | Tail-Gas |
|---|---|---|---|
| H2 | 89.2 | 99.98 | 48.8 |
| C1 | 3.3 | 0.01 | 13.9 |
| C2 | 2.8 | 0.01 | 13.9 |
| C3 | 2.0 | 0.00 | 10.2 |
| C4+ | 2.6 | 0.00 | 13.2 |
| CO | 50 | 1.1 | 198.4 |
| total | 0.971 | 0.760 | 0.211 |
| | 300 psig | 290 psig | 40 psig |

H2 at 99.99% purity and 88% recovery

Example 8

Tables 5a and 5b compare the performance of RCPSA's operated in accordance with the invention being described here. The stream being purified has lower H₂ in the feed (51% mol) and is a typical refinery/petrochemical stream. In both cases (corresponding to Tables 5a and 5b), a counter current depressurization step is applied after the co-current step. In accordance with the invention, Table 5a shows that high H₂ recovery (81%) is possible even when all the tail gas is released at 65 psig or greater. In contrast, the RCPSA where some tail-gas is available as low as 5 psig, loses hydrogen in the counter-current depressurization such that H₂ recovery drops to 56%. In addition, the higher pressure of the stream in Table 5a indicates that no tail gas compression is required.

Tables 5a & 5b

Effect of Tail Gas Pressure on Recovery

Example of RCPSA Applied to a Feed with H2 Concentration (51.3 mol %) Composition (mol %) of Input and Output from RCPSA (31 ft³) in H2 purification.

Feed is at 273 psig, 122 deg F. and Feed rate is about 5.1 MMSCFD.

TABLE 5a

Step Times in seconds are $t_F = 0.5$, $t_{CO} = 0.083$, $t_{CN} = 0.033$, $t_P = 0.25$, $t_{RP} = 0.133$

| | feed | product | Tail-Gas |
|---|---|---|---|
| H2 | 51.3 | 99.71 | 20.1 |
| C1 | 38.0 | 0.29 | 61.0 |
| C2 | 4.8 | 0.00 | 8.0 |
| C3 | 2.2 | 0.00 | 3.8 |
| C4+ | 3.7 | 0.00 | 6.4 |
| H2O | 4000 vppm | 0.7 vppm | 6643 vppm |
| total (MMSCFD) | 5.142 | 2.141 | 3.001 |
| | 273 psig | 263 psig | 65-83 psig |

[a] Tail gas available from 65-83 psig, H2 at 99.7% purity and 81% recovery

TABLE 5b

Step Times in sec. are $t_F = 0.667$, $t_{CO} = 0.167$, $t_{CN} = 0.083$, $t_P = 0.083$, $t_{RP} = 0.33$

| | feed | product | Tail-Gas |
|---|---|---|---|
| H2 | 51.3 | 99.99 | 34.2 |
| C1 | 38.0 | 0.01 | 48.8 |
| C2 | 4.8 | 0.00 | 6.9 |
| C3 | 2.2 | 0.00 | 3.4 |
| C4+ | 3.7 | 0.00 | 6.2 |
| H2O | 4000 vppm | 0.0 vppm | 5630 vppm |
| total (MMSCFD) | 5.142 | 1.490 | 3.651 |
| | 273 psig | 263 psig | 5-65 psig |

[b] Tail gas available from 5-65 psig, H2 at 99.9% purity and 56% recovery

Example 9

In this example, Tables 6a and 6b compare the performance of RCPSA's operated in accordance with the invention being described here. In these cases, the feed pressure is 800 psig and tail gas is exhausted at either 65 psig or at 100 psig. The composition reflects typical impurities such H2S, which can be present in such refinery applications. As can be seen, high recovery (>80%) is observed in both cases with the high purity >99%. In both these cases, only a co-current depressurization is used and the effluent during this step is sent to other beds in the cycle. Tail gas only issues during the countercurrent purge step. Table 6c shows the case for an RCPSA operated where some of the tail gas is also exhausted in a countercurrent depressurization step following a co-current depressurization. The effluent of the co-current depressurization is of sufficient purity and pressure to be able to return it one of the other beds in the RCPSA vessel configuration that is part of this invention. Tail gas i.e., exhaust gas, issues during the counter-current depressurization and the counter-current purge steps.

In all cases the entire amount of tail gas is available at elevated pressure which allows for integration with other high pressure refinery process. This removes the need for any form of required compression while producing high purity gas at high recoveries. In accordance with the broad claims of this invention, these cases are only to be considered as illustrative examples and not limiting either to the refinery, petrochemical or processing location or even to the nature of the particular molecules being separated.

Tables 6a, 6b, & 6c

Example of RCPSA Applied to a High Pressure Feed
Composition (mol %) of input and output from RCPSA (18 ft$^3$) in H2 purification.
Feed is at 800 psig, 122 deg F. and Feed rate is about 10.1 MMSCFD.

| 6a. Step Times in seconds are $t_F$ = 0.91, $t_{CO}$ = 0.25, $t_{CN}$ = 0, $t_P$ = 0.33, $t_{RP}$ = 0.33 | | | |
|---|---|---|---|
| | feed | product | Tail-Gas |
| H2 | 74.0 | 99.99 | 29.5 |
| C1 | 14.3 | 0.01 | 37.6 |
| C2 | 5.2 | 0.00 | 14.0 |
| C3 | 2.6 | 0.00 | 7.4 |
| C4+ | 3.9 | 0.00 | 10.9 |
| H2S | 20 vppm | 0 | 55 vppm |
| total (MMSCFD) | 10.187 | 6.524 | 3.663 |
| | 800 psig | 790 psig | 65 psig |

[a] Tail gas at 65 psig, H2 at 99.9% purity and 87% recovery

| 6b. Step Times in seconds are $t_F$ = 0.91, $t_{CO}$ = 0.25, $t_{CN}$ = 0, $t_P$ = 0.33, $t_{RP}$ = 0.33 | | | |
|---|---|---|---|
| | feed | product | Tail-Gas |
| H2 | 74.0 | 99.93 | 38.1 |
| C1 | 14.3 | 0.07 | 32.8 |
| C2 | 5.2 | 0.00 | 12.5 |
| C3 | 2.6 | 0.00 | 6.5 |
| C4+ | 3.9 | 0.00 | 9.6 |
| H2S | 20 vppm | 0 vppm | 49 vppm |
| total (MMSCFD) | 10.187 | 6.062 | 4.125 |
| | 800 psig | 790 psig | 100 psig |

[b] Tail gas at 100 psig, H2 at 99.93% purity and 80.3% recovery

| 6c. Step times in seconds are $t_F$ = 0.91, $t_{CO}$ = 0.083, $t_{CN}$ = 0.25, $t_P$ = 0.167, $t_{RP}$ = 0.41 | | | |
|---|---|---|---|
| | feed | product | Tail-Gas |
| H2 | 74.0 | 99.95 | 28.9 |
| C1 | 14.3 | 0.05 | 39.0 |
| C2 | 5.2 | 0.00 | 13.7 |
| C3 | 2.6 | 0.00 | 7.2 |
| C4+ | 3.9 | 0.00 | 10.6 |
| H2S | 20 vppm | 0.01 vppm | 53 vppm |
| total (MMSCFD) | 10.187 | 6.373 | 3.814 |
| | 800 psig | 790 psig | 65-100 psig |

[c] Tail gas from 65-100 psig, H2 at 99.8% purity and 84% recovery

Example 10

Tables 7a, 7b, and 7c compare the performance of RCPSA's operated in accordance with the invention being described here. The stream being purified has higher H$_2$ in the feed (85% mol) and is a typical refinery/petrochemical stream. In these examples the purity increase in product is below 10% (i.e. P/F<1.1). Under this constraint, the method of the present invention is able to produce hydrogen at >90% recovery without the need for tail gas compression.

Tables 7a, 7b, & 7c

Example of RCPSA applied to a Feed with H2 concentration (85 mol %).
Composition (mol %) of input and output from RCPSA (6.1 ft$^3$).
Feed is at 480 psig, 135 deg F. and Feed rate is about 6 MMSCFD.

| 7a. Step Times in seconds are $t_F$ = 0.5, $t_{CO}$ = 0.33, $t_{CN}$ = 0.167, $t_P$ = 0.167, $t_{RP}$ = 1.83 recovery = 85% | | | |
|---|---|---|---|
| | feed | product | Tail-Gas |
| H2 | 85.0 | 92.40 | 57.9 |
| C1 | 8.0 | 4.56 | 17.9 |
| C2 | 4.0 | 1.79 | 13.1 |
| C3 | 3.0 | 1.16 | 10.4 |
| C4+ | 0.0 | 0.00 | 0.0 |
| H2O | 2000 | 866.5 | 6915 |
| total (MMSCFD) | 6.100 | 4.780 | 1.320 |
| | 480 psig | 470 psig | 65 psig |

| 7b. Step Times in sec. are $t_F$ = 1, $t_{CO}$ = 0.333, $t_{CN}$ = 0.167, $t_P$ = 0.083, $t_{RP}$ = 0.417 recovery = 90% | | | |
|---|---|---|---|
| | feed | product | Tail-Gas |
| H2 | 85.0 | 90.90 | 58.2 |
| C1 | 8.0 | 5.47 | 18.1 |
| C2 | 4.0 | 2.23 | 12.9 |
| C3 | 3.0 | 1.29 | 10.1 |
| C4+ | 0.0 | 0.00 | 0.0 |
| H2O | 2000 | 1070.5 | 6823 |
| total (MMSCFD) | 6.120 | 5.150 | 0.969 |
| | 480 psig | 470 psig | 65 psig |

| 7c. Step Times in sec. are $t_F$ = 2, $t_{CO}$ = 0.667, $t_{CN}$ = 0.333, $t_P$ = 0.167, $t_{RP}$ = 0.833 recovery = 90% | | | |
|---|---|---|---|
| | feed | product | Tail-Gas |
| H2 | 85.0 | 90.19 | 55.2 |
| C1 | 8.0 | 6.21 | 18.8 |
| C2 | 4.0 | 2.32 | 13.9 |
| C3 | 3.0 | 1.17 | 11.3 |
| C4+ | 0.0 | 0.00 | 0.0 |
| H2O | 2000 | 1103.5 | 7447 |
| total (MMSCFD) | 6.138 | 5.208 | 0.93 |
| | 480 psig | 470 psig | 65 psig |

What is claimed is:
1. A process for increasing the hydrogen purity in a hydrogen-containing input stream associated with a petrochemical process, which process comprises subjecting the hydrogen-containing input stream to a rapid cycle pressure swing adsorption unit containing a plurality of beds and having a total cycle time of less than about 30 seconds, said total cycle time, $t_{TOT}$, being defined by the equation $t_{TOT}=t_F+t_{CO}+t_{CN}+t_P+t_{RP}$, wherein $t_F$ represents a time for product adsorption, $t_{CO}$ represents a time for co-current depressurization, $t_{CN}$ represents a time for counter-current depressurization, $t_P$ represents a time for bed purging, and $t_{RP}$ represents a time for bed repressurization, and said rapid cycle pressure swing adsorption unit having a pressure drop within each adsorbent bed of greater than about 5 inches of water per foot of bed length, thus forming a purified hydrogen-containing gas product, wherein the purified hydrogen-containing gas product is recovered from the rapid cycle pressure swing adsorption unit, relative to the hydrogen-containing input stream, and wherein one or more of $t_F$, $t_{CO}$, $t_{CN}$, $t_P$, and $t_{RP}$ are controlled so as to exhibit (i) a rate of recovery (R %) greater than 80% for a hydrogen purity to feed ratio (P %/F %) greater than 1.1, (ii) a rate of recovery (R %) greater than 90% for a hydrogen purity to feed ratio (P %/F %) less than 1.1 but greater than 1, or (iii) both (i) and (ii).

2. The process of claim 1 wherein the petrochemical process is one or more selected from the group consisting of xylene isomerization, ethylbenzene hydroisomerization to xylenes, toluene disproportionation, selective toluene disproportionation, and toluene, benzene and $C_9^+$ transalkylation.

3. The process of claim 2 wherein the total cycle time of rapid cycle pressure swing adsorption is less than about 15 seconds.

4. The process of claim 3 wherein the total cycle time is less than about 10 seconds and the pressure drop of each adsorbent bed is greater than about 10 inches of water per foot of bed length.

5. The process of claim 4 wherein the total cycle time is less than about 5 seconds.

6. The process of claim 5 wherein the pressure drop of each adsorbent bed is greater than about 10 inches of water per foot of bed length.

* * * * *